United States Patent
Inaba et al.

[15] 3,636,525
[45] Jan. 18, 1972

[54] TIME-SHARED NUMERICAL CONTROLLER FOR SIMULTANEOUS CONTROL OF A PLURALITY OF MACHINE TOOLS

[72] Inventors: Seiuemon Inaba; Norito Yoshitake, both of Kawasaki-shi; Ryoji Imazeki, Yokohama-shi; Yoshinori Kozai, Kunitachi-shi, all of Japan

[73] Assignee: Fujitsu Limited, Kawasaki, Japan

[22] Filed: Dec. 23, 1969

[21] Appl. No.: 887,619

[30] Foreign Application Priority Data

Dec. 23, 1968  Japan....................................43/94721

[52] U.S. Cl......................................340/172.5, 235/151.11
[51] Int. Cl. ....................................G05b 19/18, G06f 15/46
[58] Field of Search...........................340/172.5; 235/151.11

[56] References Cited

UNITED STATES PATENTS

3,465,298  9/1969  La Duke et al. .....................340/172.5

Primary Examiner—Raulfe B. Zache
Assistant Examiner—R. F. Chapuran
Attorney—Curt M. Avery, Arthur E. Wilfond, Herbert L. Lerner and Daniel J. Tick

[57] ABSTRACT

A time-shared numerical controller for simultaneously controlling machine tools in movement along a plurality of axes comprises a time-shared multiplexing pulse distributor having a memory. An input coupled to the memory of the pulse distributor writes into the memory command data and the results of an arithmetic operation relating to the magnitude of movement of a plurality of movable axes to be controlled. An output coupled to the memory reads out from the memory the command data and the results. A selecting circuit coupled to the memory selects the place of write-in and readout of the data to and from the memory. A time-shared multiplexing pulse train arithmetic circuit coupled to the pulse distributor provides arithmetic operations and pulse distribution in common for the plurality of axes. An output coupled to the arithmetic circuit separates and provides output pulses corresponding to the plurality of axes.

4 Claims, 13 Drawing Figures

TIME SHARED MULTIPLEXING FEED PULSE GENERATOR FPG

FIG. 3A

*TIME SHARED MULTIPLEXING FEED PULSE GENERATOR FPG*

TIME SHARED MULTIPLEXING
PULSE DISTRIBUTOR MPD

FIG. 5B

TIME SHARED MULTIPLEXING
PULSE DISTRIBUTOR MPD

SINGLE AXIS CIRCUIT
DERIVED FROM SMOOTHING
CIRCUIT OF FIG. 8

TIME-SHARED NUMERICAL CONTROLLER FOR SIMULTANEOUS CONTROL OF A PLURALITY OF MACHINE TOOLS

DESCRIPTION OF THE INVENTION

The invention relates to a time-shared numerical controller. More particularly, the invention relates to a time-shared numerical controller for simultaneously controlling a plurality of machine tools in movement along a plurality of axes.

In a control system of known type for the numerical control of machine tools, each of the machine tools is provided with a corresponding one of a plurality of numerical controllers. The plurality of numerical controllers are controlled by a common computer. In such integrated control systems, a plurality of numerical controllers of known type are controlled and the system is thus expensive in production and operation as the number of controlled axes increases. Furthermore, the numerical controllers mutually overlap in operation, so that the efficiency of utilization of the numerical controllers is not high.

The principal object of the invention is to provide a new and improved time-shared numerical controller.

An object of the invention is to provide a time-shared numerical controller which overcomes the disadvantages of numerical controllers of known type.

An object of the invention is to provide a time-shared numerical controller which is inexpensive in production and operation.

An object of the invention is to provide a time-shared numerical controller for simultaneously controlling a plurality of machine tools with a high efficiency of utilization.

An object of the invention is to provide a time-shared numerical controller for simultaneously controlling a plurality of machine tools with efficiency, effectiveness and reliability.

An object of the invention is to provide a time-shared numerical controller wherein pulse distribution for a plurality of axes, generation of feed pulses and smoothing of pulse trains are provided in accordance with the principle of time sharing by an arithmetic circuit.

In accordance with the invention, a time-shared numerical controller for simultaneously controlling machine tools in movement along a plurality of axes comprises a time-shared multiplexing pulse distributor having memory means. Input means coupled to the memory means of the pulse distributor writes into the memory means command data and the results of an arithmetic operation relating to the magnitude of movement of a plurality of movable axes to be controlled. Output means coupled to the memory means reads out from the memory means the command data and the results. A selecting circuit coupled to the memory means selects the place of write-in and readout of data to and from the memory means. A time-shared multiplexing pulse train arithmetic circuit coupled to the pulse distribution provides arithmetic operations and pulse distribution in common for the plurality of axes. Output means coupled to the arithmetic circuit separates and provides output pulses corresponding to the plurality of axes.

A time-shared multiplexing pulse train smoothing circuit is coupled between the pulse distributor and the output means for independently smoothing pulse trains distributed to the plurality of axes. The smoothing circuit comprises memory means. Input means coupled to the memory means of the smoothing circuit writes into the memory means the accumulated value and the results of an arithmetic operation relating to pulses distributed by the pulse distributor to the plurality of movable axes. Output means coupled to the memory means reads out from the memory means the accumulated value and the results. A selecting circuit coupled to the memory means selects the place of write-in and readout of data to and from the memory means.

A time-shared multiplexing feed pulse generator independently controls the feed rate of feed pulses of the plurality of axes. The feed pulse generator comprises memory means. Input means coupled to the memory means of the feed pulse generator writes into the memory means command data and the results of an arithmetic operation relating to the feed rate of feed pulses of the plurality of movable axes. Output means coupled to the memory means reads out from the memory means the command data and the results. A selecting circuit coupled to the memory means selects the place of write-in and readout of data to and from the memory means. The arithmetic circuit is coupled to the feed pulse generator and the pulse distributor. The output means coupled to the arithmetic circuit provides the output pulses of the pulse distributor in synchronism with the output pulses of the feed pulse generator.

In accordance with the invention, a time-shared numerical controller for simultaneously controlling machine tools in movement along a plurality of axes comprises a time-shared multiplexing pulse distributor. A time-shared multiplexing pulse train smoothing circuit coupled to the pulse distributor independently smoothes pulse trains distributed to the plurality of axes. A time-shared multiplexing feed pulse generator coupled to the smoothing circuit independently controls the feed rate of feed pulses of the plurality of axes. Each of the pulse distributor, the smoothing circuit and the feed pulse generator has memory means, input means coupled to the memory means for writing into the memory means command data and the results of an arithmetic operation relating to the plurality of movable axes to be controlled, output means coupled to said memory means for reading out from the memory means the command data and the results, and a selecting circuit coupled to the memory means for selecting the place of write-in and readout of data to and from the memory means. A time-shared multiplexing pulse train arithmetic circuit is coupled to the pulse distributor and to the feed pulse generator for providing arithmetic operations and pulse distribution in common for the plurality of axes. Output means coupled to the arithmetic circuit and to the smoothing circuit separates and provides output pulses corresponding to the plurality of axes.

In order that the invention may be readily carried into effect, it will now be described with reference to the accompanying drawings, wherein.

Figure 1:
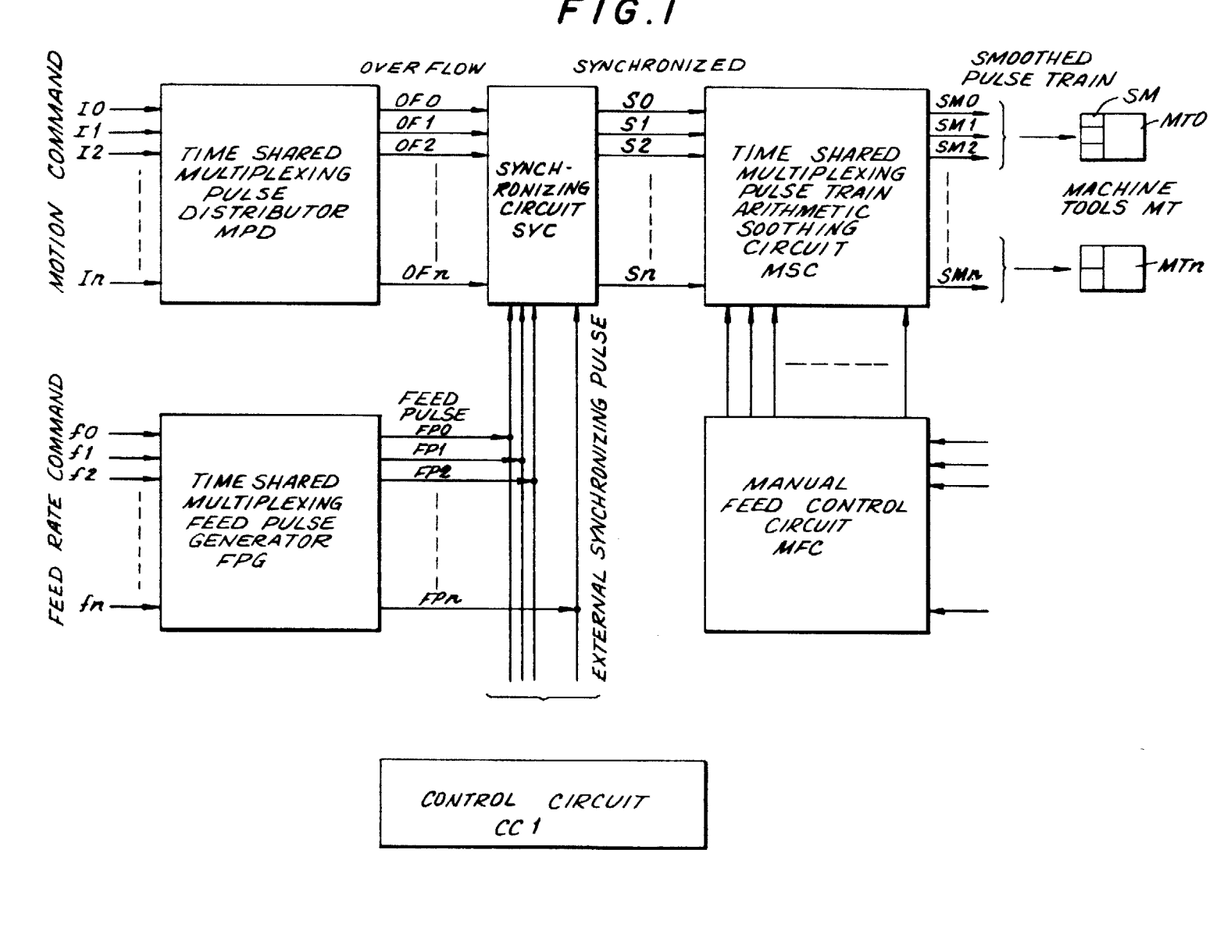
FIG. 1 is a block diagram of an embodiment of the time-shared numerical controller of the invention.

The time-shared numerical controller of the invention, as shown in FIG. 1, comprises a time-shared multiplexing pulse distributor MPD coupled to a synchronizing circuit SYC. A time-shared multiplexing feed pulse generator FPG is coupled to the synchronizing circuit SYC and to a control circuit CC. The synchronizing circuit SYC is coupled to a time-shared multiplexing pulse train arithmetic smoothing circuit MSC. A manual feed control circuit MFC is also coupled to the time-shared multiplexing pulse train arithmetic smoothing circuit MSC. A plurality of machine tools MT are coupled to, and controlled by, the outputs of the time-shared multiplexing pulse train arithmetic smoothing circuit MSC.

When the number of the controlled axes of a plurality of controlled objects such as, for example, machine tools, is $n+1$, for example, each object is controlled as follows. Numerical data, which constitutes command data relating to the magnitude of movement of the machine tool, is provided as $n+1$ inputs I0 to I$n$ (FIG. 1). The inputs I0 to I$n$, corresponding to $n+1$ controlled axes, are supplied to the time-shared multiplexing pulse distributor MPD. The pulse distributor MPD provides a number of pulses equal to the command data at $n+1$ output terminals corresponding to the axes of the machine tool.

The output OF0 of the pulse distributor MPD corresponds to its input I0 and is derived as a pulse train of a number of pulses equal to the numerical value represented by the input I0. Arithmetic operations for providing the output pulses are performed in accordance with the principle of time sharing and are repeated a designated number of times in the order of, for example, the $0^{th}$ axis, the $1^{st}$ axis, the $2^{nd}$, ... the $n^{th}$ axis. The arithmetic circuit is hereinafter described in detail.

Input numerical data, comprising command data relating to the velocity of movement of the machine tools, is provided as $n+1$ inputs $f0$ to $fn$. The inputs $f0$ to $fn$ correspond to the inputs I0 to I$n$ of the pulse distributor MPD and are supplied to the time-shared multiplexing feed pulse generator FPG. The feed pulse generator FPG generates, at $n+1$ output terminals, a plurality of pulse trains or feed pulses FP0 to FP$n$ having frequencies proportional to the command data. The output FP0 corresponds to the input $f0$, for example, and is a pulse train having a frequency proportional to the command data supplied to said input.

An arithmetic circuit for providing output pulses in the feed pulse generator FPG is similar to that provided for the pulse distributor MPD. In both arithmetic circuits, arithmetic operations are performed in accordance with the principle of time sharing for a plurality of axes. The arithmetic circuit is hereinafter described in detail.

The synchronizing circuit SYC stores the output pulses of the pulse distributor MPD and transfers them in synchronism with the output pulses of the feed pulse generator FPG. Thus, the outputs OF0 to OF$n$ of the pulse distributor MPD are provided at the outputs S0 to S$n$ of the synchronizing circuit SYC in synchronism with the outputs FP0 to FP$n$ of the feed pulse generator FPG. The outputs S0 to S$n$ of the synchronizing circuit SYC are supplied to the input of the time-shared multiplexing pulse train arithmetic smoothing circuit MSC.

The pulse train arithmetic smoothing circuit MSC has $n+1$ output terminals corresponding to the inputs S0 to S$n$. The pulse train arithmetic smoothing circuit MSC functions to smooth pulses of each of the pulse trains. Thus, the pulse train arithmetic smoothing circuit MSC smoothes the pulses of the pulse train S0, for example, by converting said pulse train into a pulse train having no rapid frequency variations, and transfers the converted pulse train to its output terminal SM0. The same operation is provided for each of the other axes. Arithmetic operations for the smoothing of pulse trains are also performed in accordance with the principle of time sharing for all the axes in the designated order.

In the example of FIG. 1, the $0^{th}$, the $1^{st}$ and the $2^{nd}$ axes are utilized to control the axes of a machine tool MT0, which machine tool requires simultaneous three axis control. The $4^{th}$ to $n^{th}$ axes are utilized to control the other machine tools. The manual feed control circuit MFC manually controls a machine tool to set the origin of said machine tool. This circuit is not described in detail herein, since it is not directly related to the invention and comprises known circuitry.

In FIG. 1, command data is supplied from a computer to each of the pulse distributor MPD and the feed pulse generator FPG each time the distributing arithmetic operation of one block, for which pulse distribution has been performed, is completed.

Figure 2:
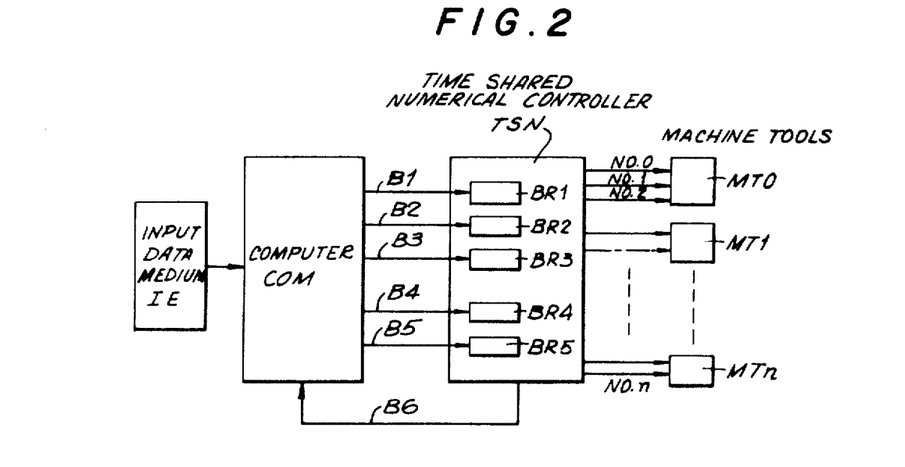
FIG. 2 is a block diagram of a system combining the time-shared numerical controller of the invention with a computer.

In FIG. 2, the numerical controller of the invention is connected to a computer. In FIG. 2, an input data medium IE is coupled to a computer COM. The computer is coupled to the time-shared numerical controller TSN of the invention. The time-shared numerical controller TSN is coupled to a plurality of machine tools MT0 to MT$n$. The input data medium IE supplies the computer COM with numerical data relating to the cutting pattern for the machine tools MT0 to MT$n$. The designated arithmetic operations are performed where necessary, in the computer, and the numerical data is then stored in the memory of the computer as command data relating to the different axes. The time-shared numerical controller TSN includes a plurality of buffer registers BR1 to BR5. The information data from the computer COM is supplied to the buffer register BR1 to BR5 of the numerical controller TSN.

Command data relating to the magnitude of movement of a machine tool is directly supplied to the buffer register BR1 via a line B1. Command data relating to the magnitude of movement of a machine tool is directly supplied from the computer COM to the second buffer register BR2 via a line B2. The axis address of the command data is directly supplied from the computer COM to the third buffer register BR3 via a line B3. Command data relating to the feed rate of the pulses supplied to a machine tool is directly supplied to the buffer register BR4 via a line B4. The axis address of the command data is directly supplied to the buffer register BR5 via a line B5. A line B6 from the time-shared numerical controller TSN to the computer COM supplies command data to said computer which commands the supply of the next command data when the distribution of pulses of one block for the axes of the designated machine is completed.

Figure 3A:
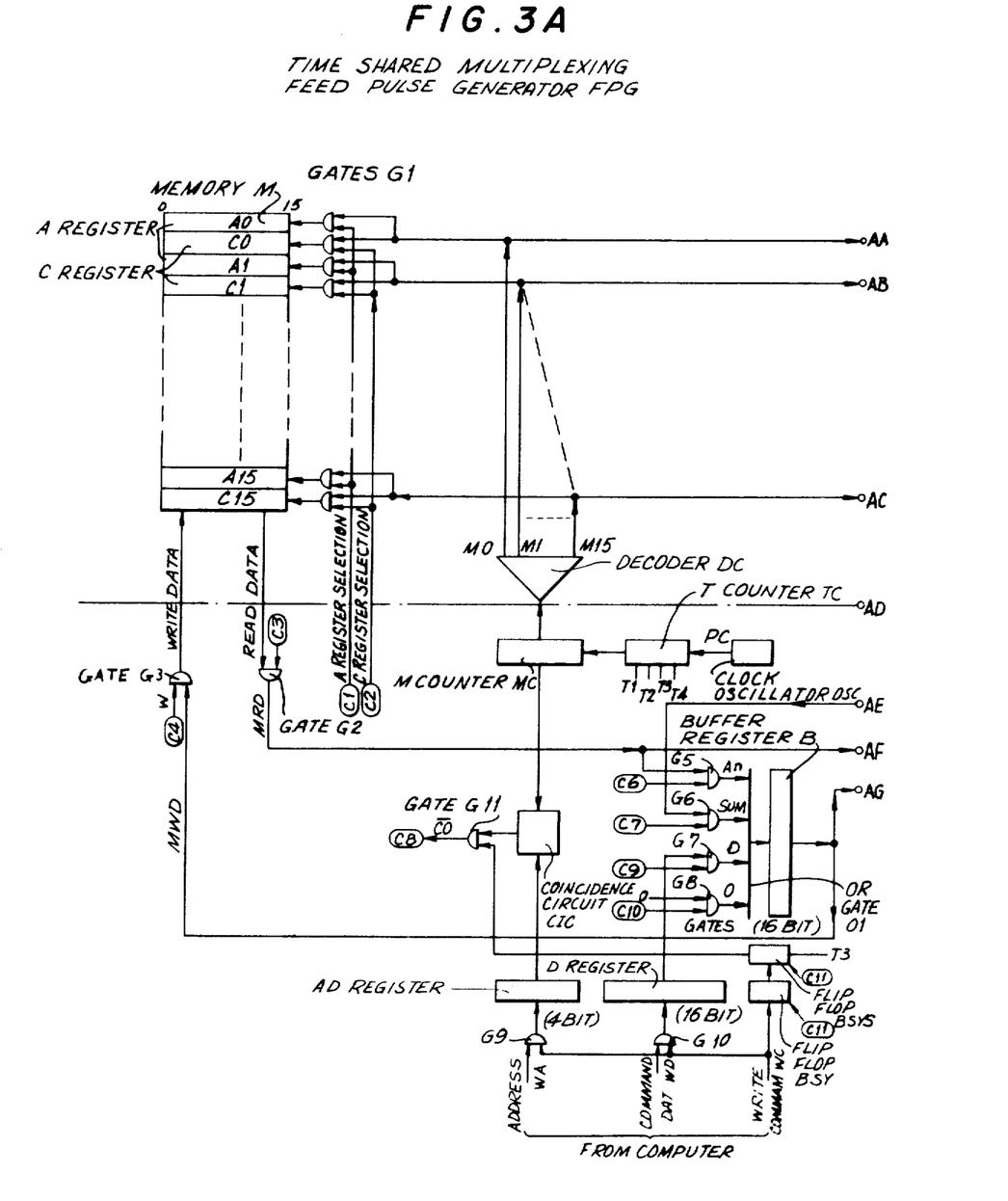
FIGS. 3A and 3B, which together constitute a single figure, are a circuit diagram of an embodiment of the time-shared multiplexing feed pulse generator FPG of FIG. 1.
Figure 3B:
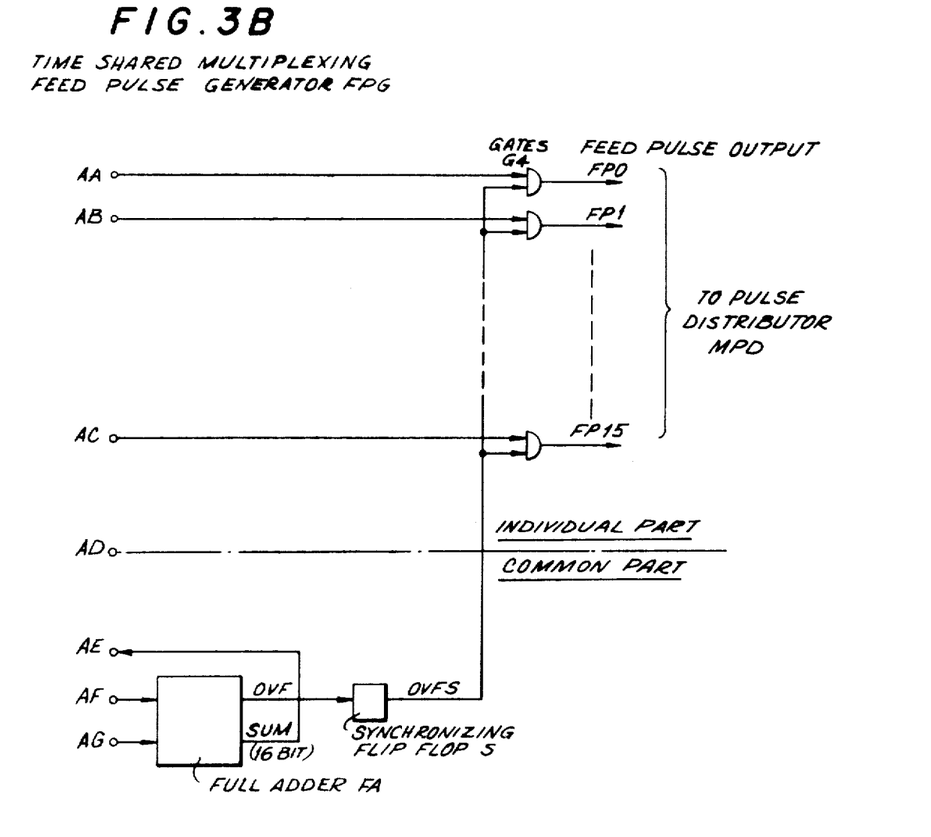
Figure 4A:
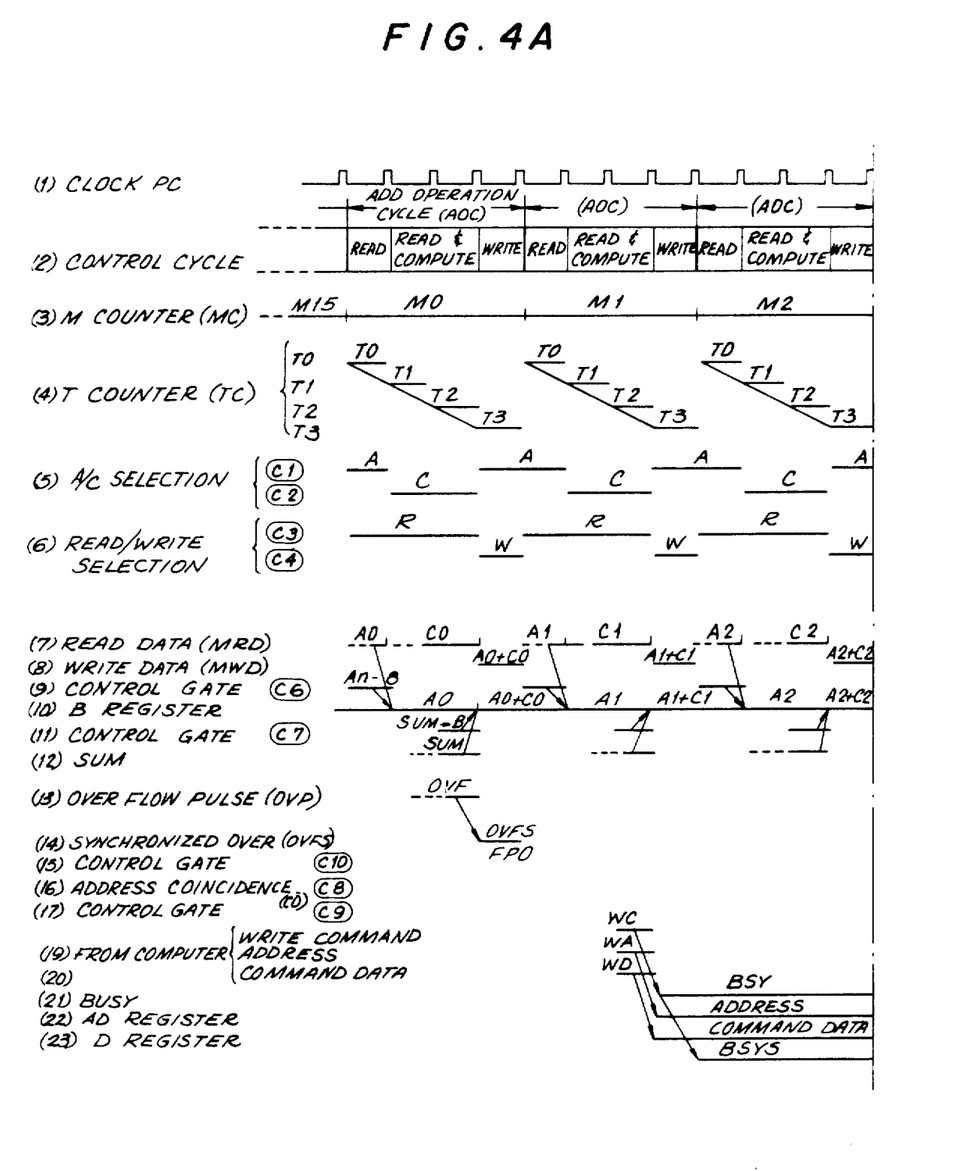
FIGS. 4A and 4B, which together constitute a single figure, are a time chart explaining the operation of the time-shared multiplexing feed pulse generator FPG of FIGS. 3A and 3B.
Figure 4B:
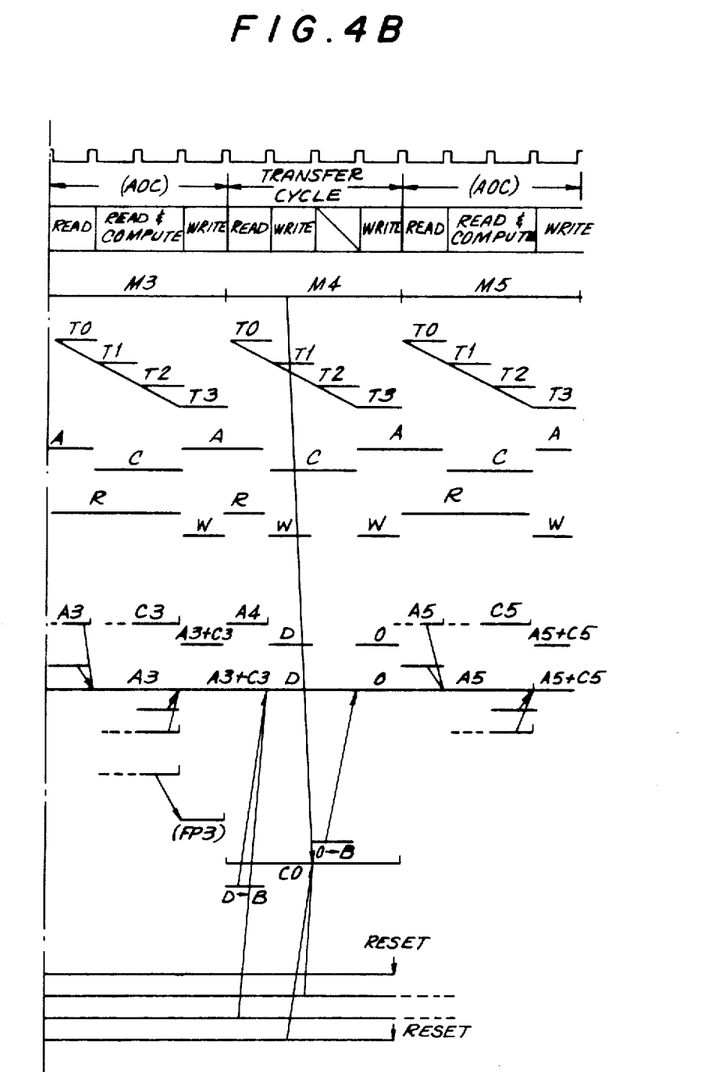

FIGS. 3A and 3B are a circuit diagram of an embodiment of the time-shared multiplexing feed pulse generator FPG of FIG. 1 and FIGS. 4A and 4B are a time chart explaining the operation of the circuit of FIGS 3A and 3B. In the example of FIGS. 3A and 3B, the number of controlled axes is 16. A memory M includes 16 A-registers A0 to A15 and 16 C-registers C0 to C15, corresponding to the 16 axes. Thus, for example, the A0- and C0-registers each correspond to axis No. 0, and the result of an arithmetic operation for the generation of feed pulses for axis No. O is stored in the A0-register and command data relating to the feed rate for axis No. O is stored in the C0-register. The other registers A1 to A15 and C1 to C15 operate in the same manner.

Each of a plurality of gates G1 corresponds to each of the A-registers and C-registers. The register A0 is selected if a signal C1 becomes "1" when a designated signal such as, for example, M0 is produced by a decoder DC. The designated signal M0 is one of a plurality of axis selecting signals M0 to M15 produced by the decoder DC. The register C0 is selected if a signal C2 becomes "1" when the axis selecting signal M0 is produced by the decoder DC. If a signal C3 becomes "1" when a specific register such as, for example, the register A0, is selected in the aforedescribed manner, the contents of the register A0 are read out via a gate G2 and are supplied to a full adder FA. If a signal C4 becomes "1" when a specific register such as, for example, the register A0, is selected, the contents of a buffer register B are written into the memory M via a gate G3.

A group of output gates G4 comprises 16 gates corresponding to the 16 axes 0 to 15. A clock oscillator OSC produces clock pulses PC and supplies said clock pulses to a T-counter TC. The T-counter TC is a quaternary counter. The T-counter TC provides signals T0, T1, T2 and T3, periodically and cyclically in correspondence with the four types of conditions of said counter. When the signals T0 to T3 have been once circulated, in a full cycle, so that the signal after T3 is T0, the T-counter TC causes an M-counter MC to count one pulse. The M-counter MC is a binary counter of four bits which is able to count 16 pulses. Each counting condition of the M-counter MC is decoded by the decoder DC to produce the axis selecting signals M0 to M15.

When the selecting signal M0 for selecting axis No. 0 is provided by the decoder DC, an arithmetic operation is performed by an arithmetic circuit in relation to the register A0 and the register C0. The output pulse, which is the result of the arithmetic operation, is supplied as a feed pulse output FPO via a gate of the group of gates G4. A cycle of arithmetic operation is completed while the condition of the T-counter TC completes a cycle of T0 to T3. If "1" is counted in the M-counter MC as a result, the signal M1 is produced by the decoder DC and a feed pulse is provided for axis No. 1.

The arithmetic circuit includes the buffer register B, the full adder FA, AND-gates G5 to G8 and an OR-gate O1. An AD-register and a D-register are provided. The axis address WA is written into the AD-register via a gate G9. A command signal WD for the feed rate is written into the D-register via a gate G10. The signals WA and WD are written into the corresponding registers under the control of a write command WC. The signals WA, WD and WC are provided by a computer. If the contents of the M-counter MC coincide with the contents of the AD-register, and the coincidence is detected by a coincidence circuit CIC, and a flip-flop BSYS is in its set condition, a coincidence signal $\overline{CO}$ is provided via an AND-gate G11. The command signal for feed rate in the D-register may be transferred to the buffer register B via the gate G7 under the control of a signal C9.

In the described embodiment of the time-shared numerical controller of the invention, arithmetic operation for the production of feed pulses is performed by the known DDA system. In the case of axis No. O, for example, the command value for the feed rate is stored in the register CO of the memory M and the contents of said register are added to the register AO via the full adder FA (FIGS. 3A and 3B). The initial value of the register AO is zero. The result is stored in the AD-register. If an overflow pulse is produced as a result of the arithmetic operation, such pulse is supplied to the group of gates G4 via a synchronizing flip-flop S.

The aforedescribed operation is repeated at a constant period. As is well known, the frequency of the overflow pulse will be proportional to the contents of the register CO, which contents are the command value. In the illustrated example, the arithmetic operation is performed in accordance with the principle of time sharing for 16 axes. Therefore, when one addition is performed, arithmetic operation is performed for the next axis.

The operation of the time-shared multiplexing feed pulse generator FPG of FIGS. 3A and 3B may be explained with reference to the time chart of FIGS. 4A and 4B. The operation includes two control cycles. The first control cycle is the add operation cycle, in which the contents of the C-register are added to the contents of the A-register and the result of the arithmetic operation is stored in the A-register.

Upon the advent of the signal T0 the contents of an A-register such as, for example, the register A0, selected by the output of the M-counter MC such as, for example, the signal M0, and the signal C1 are read out by the signal C3 and are stored in the buffer register B by the signal C6. The signals C1, C3 and C6 may be expressed by the logical equations $$C1 = T0 + T3$$
$$C3 = T0 + \overline{C0}(T1 + T2)$$
$$C6 = \overline{C0}(T0)$$

When the signals T1 and T2 are evident, the contents of a C-register, such as, for example, the register C0 selected by an output of the M-counter MC such as, for example, the signal M0, and the signal C2 are read out by the signal C3 and are added to the full adder FA. The sum of the full adder FA is stored or set in the buffer register B by the signal C7. If there is an overflow pulse from the full adder FA, said overflow pulse is supplied to the synchronizing flip-flop S. The signals C7 and C2 may be expressed logically as $$C7 = \overline{C0}(T2)$$
$$C2 = T1 + T2$$

When the signal T3 is evident, the contents of the buffer register B are written into an A-register such as, for example, the register A0, selected by an output of the M-counter MC such as, for example, the signal M0, by the signal C4 and the signal C1. If there is an overflow signal is this case, synchronization and shaping are provided by synchronizing flip-flop S at the time T3. Coincidence is obtained between the output OVFS of the synchronizing flip-flop S and an output of the M-counter MC such as, for example, the output signal MO. The coincidence signal is provided as a feed pulse output FPO to the pulse distributor MPD, hereinafter referred to. The signal C4 may be expressed as $$C4 = T3 + \overline{C0}(T1)$$

The second control cycle is the transfer cycle. When the computer commands that the feed rate or speed of the feed pulse be modified, the necessary processing is provided in the transfer cycle. The address of a register within the memory M and the command data are set or stored in the AD-register and the D-register from the computer and the flip-flop BSY is switched to its "1" condition. The contents of the flip-flop BSY are supplied to the flip-flop BSYS in synchronism with the signal T3. The transfer cycle is entered when the address of the AD-register coincides with the address of the M-counter MC and the flip-flop BSYS is switched to its "1" condition.

When the signal T0 is evident, the contents of the D-register are stored in the buffer register B by a signal C9. The output of the memory M is not utilized. The signal C9 may be expressed as $$C9 = C0(T0)$$

When the signal T1 is evident, the contents of the buffer register B are transferred to the register C4 by the signal C4. The register C4 is selected by an output of the M-counter MC such as, for example, the output signal M4, and the signal C2.

When the signal T2 is evident, "0" is stored in the buffer register B at the time of the signal C10 and said buffer register is cleared. The signal C10 may be expressed as $$C10 = \overline{C0}(T2)$$

When the signal T3 is evident, the contents of the buffer register B are stored by the signal C4 in the register A4 selected by an output signal of the M-counter MC such as, for example, the signal M4, and the signal C1. The register A4 is cleared. The flip-flops BSY and BSYS are reset by the signal C11. The signal C11 may be expressed as $$C11 = \overline{C0}(T3)$$

Figure 5A:
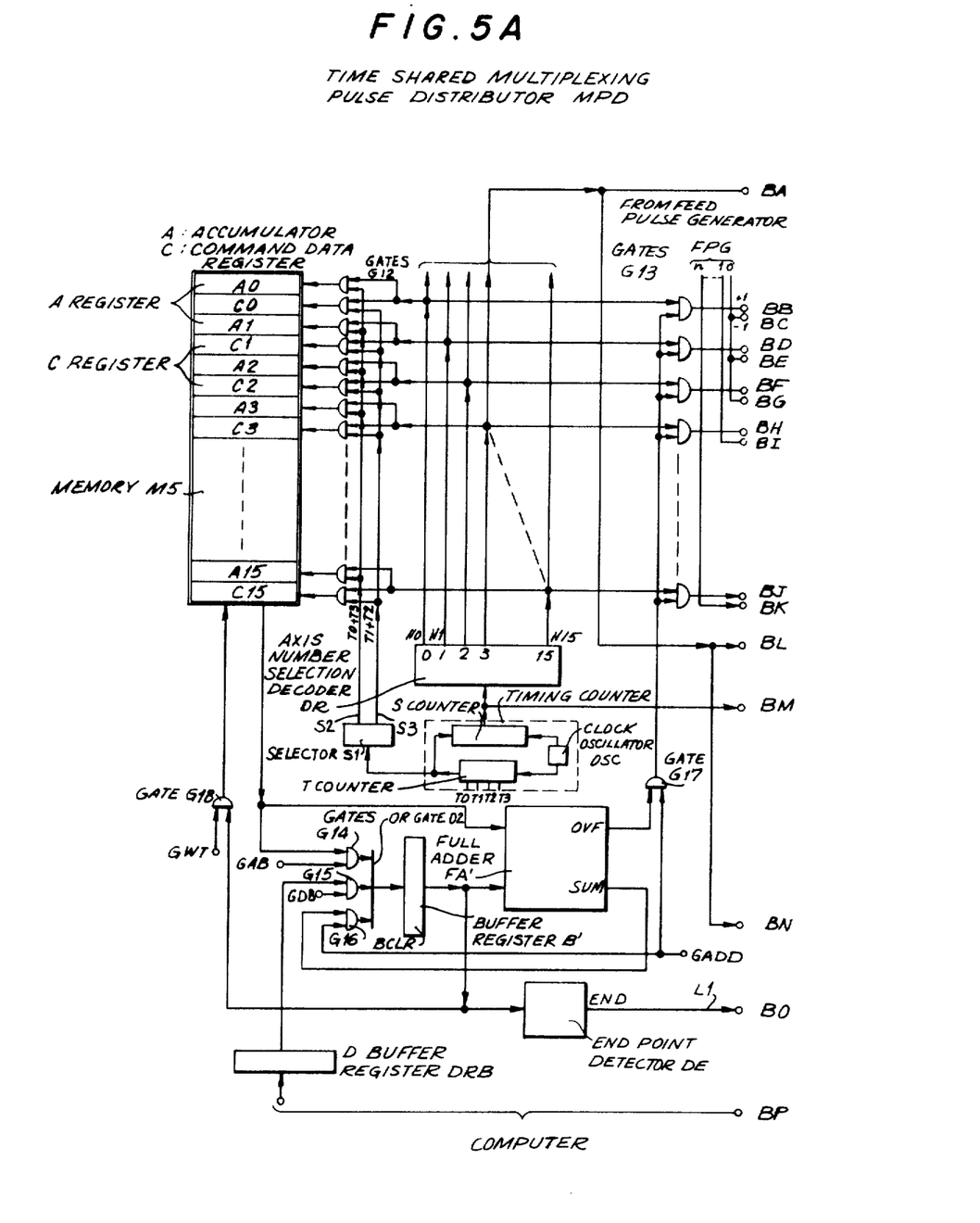
FIGS. 5A and 5B, which together constitute a single figure, are a circuit diagram of an embodiment of the time-shared multiplexing pulse distributor MPD of FIG. 1.
Figure 5B:
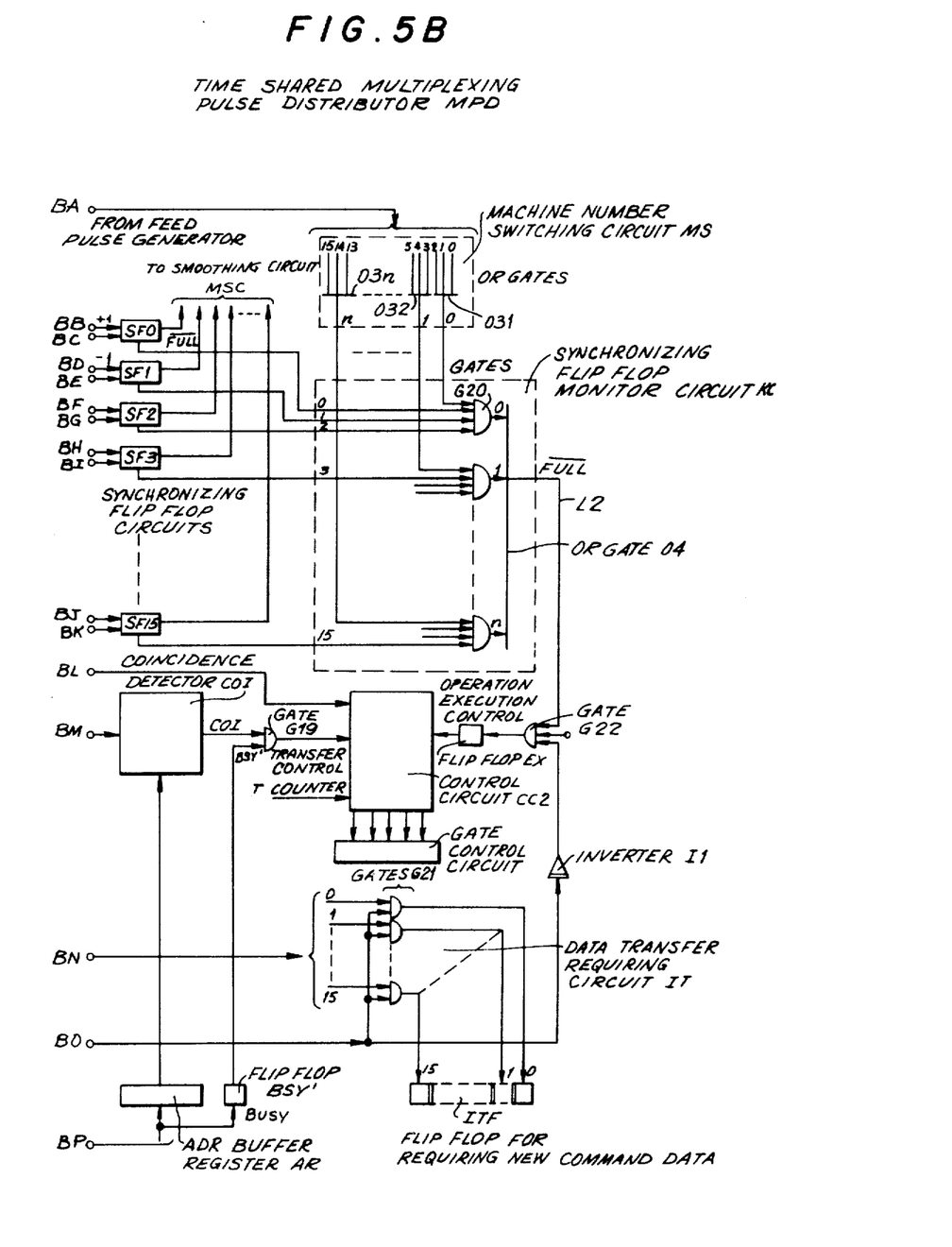
Figure 6:
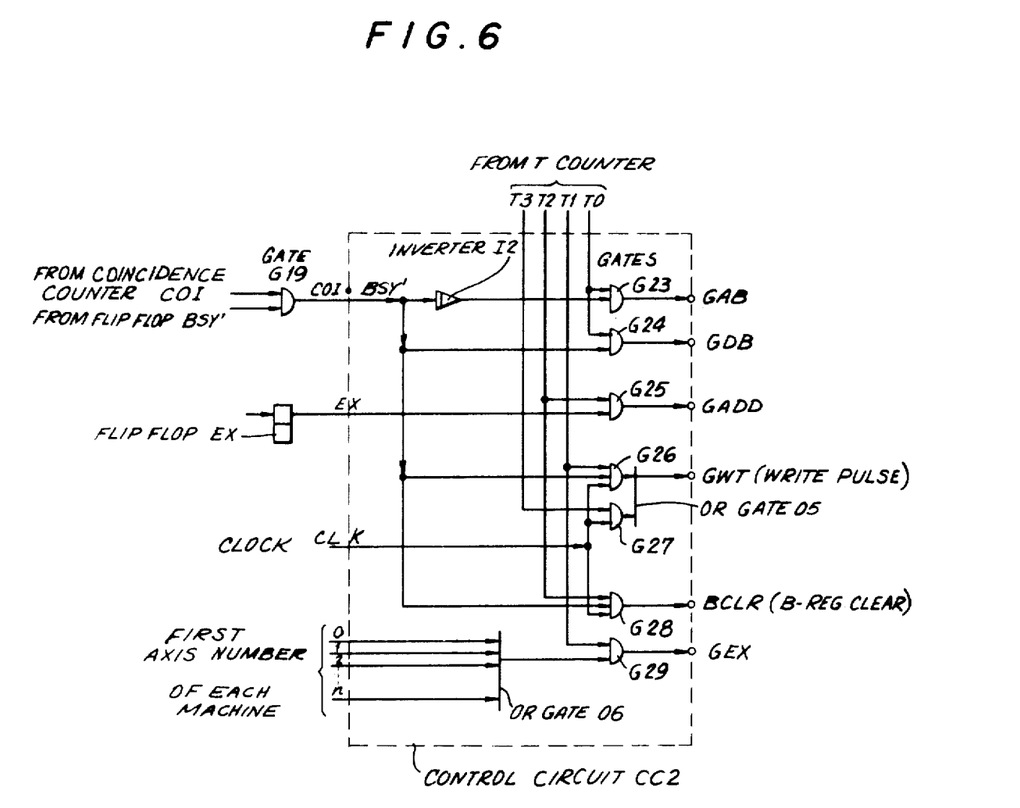
FIG. 6 is a circuit diagram of an embodiment of the control circuit of FIG. 5B.
Figure 7:
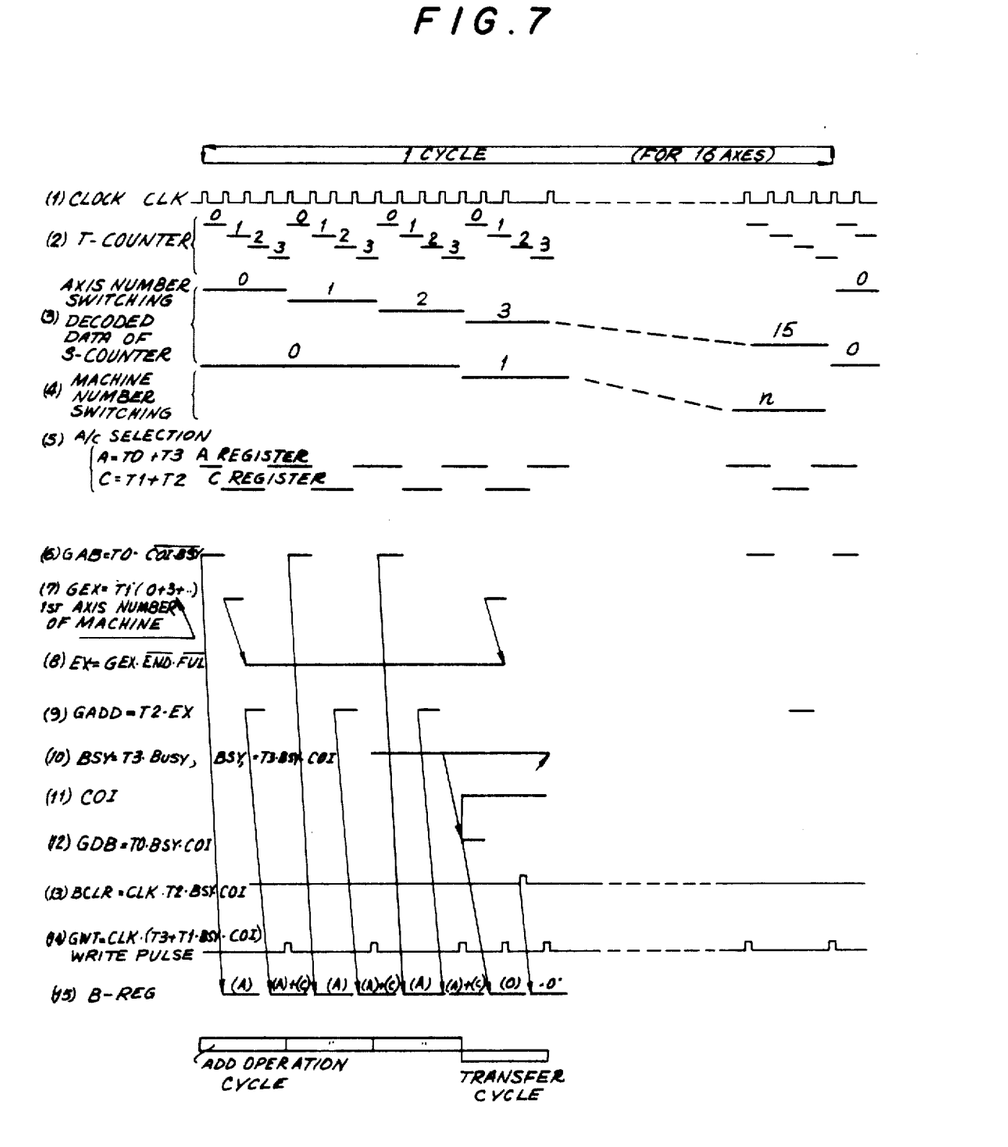
FIG. 7 is a time chart explaining the operation of the time-shared multiplexing pulse distributor MPD of FIGS. 5A and 5B.

FIGS. 5A and 5B are a circuit diagram of an embodiment of the time-shared multiplexing pulse distributor MPD of the time-shared numerical controller of FIG. 1. FIG. 6 is a circuit diagram of the control circuit of FIG. 5B. FIG. 7 is a time chart explaining the operation of the time-shared multiplexing pulse distributor MPD of FIGS. 5A and 5B.

In FIGS. 5A and 5B, a memory M5 includes 16 A-registers A0 to A15 and 16 C-registers C0 to C15. The A- and C-registers correspond to 16 axis numbers O to 15. The designated register of the memory M5 may be selected via a designated AND gate of the group of AND-gates G12. A clock oscillator OSC produces pulses and supplies said pulses to a quaternary T-counter. After a cycle of the T-counter, said counter produces a pulse which is supplied to and counted by an S-counter. The S-counter is a four-bit binary counter having 16 conditions and provides 16 signals H0 to H15 in succession, in accordance with its contents.

A selector S1 comprises a simple logic circuit supplying an output signal "1" to a line S2 when the T-counter is supplied with a signal T0 or T3. The selector S1 supplies an output signal "1" to a line S3 when the T-counter is supplied with a signal T1 or T2. Therefore, registers of the memory M5 are selected in accordance with whether the T-counter is provided with a signal T0, T1, T2 or T3, during the provision of a signal H0, indicating the axis number of an axis number selection decoder DR. The registers are selected in the order of the register A0, the register C0 and the register A0. When "1" is counted by the S-counter, the decoder DR provides a signal H1 during the variation of the T-counter from T0 to T3. The registers are selected in the order of the register A1, the register C1 and the register A1. The succeeding registers are selected in the same manner.

The signals produced by the axis number selection decoder DR for switching the numbers of the axes are supplied to the gates of a group of gates G13. The number of gates in the group of gates G13 corresponds to the number of the axes. Therefore, if distribution pulses are produced as a result of an arithmetic operation by the arithmetic circuit hereinafter described, such pulses are supplied to the output of the pulse distributor MPD via one of the gates G13 selected by the decoder DR.

The time-shared multiplexing pulse distributor MPD of FIGS. 5A and 5B includes a full adder FA', a buffer register B', a plurality of gates G14, G15 and G16 and an OR-gate OR2. These components function as an arithmetic circuit common to all the axes. A gate G17 functions to transfer the overflow pulse produced as the result of an arithmetic operation to the output gates G13. A gate G18 functions to write the contents of the buffer register B' into the selected register of the memory M5.

The gate G14 of the arithmetic circuit transfers the contents of the selected register of the memory M5 to the buffer register B'. The gate G15 of the arithmetic circuit transfers the numerical value information stored in a D-buffer-register DRB to the buffer register B'. The gate G16 of the arithmetic circuit transfers the result of the addition performed by the full adder FA' to the buffer register B'. Command data relating to the magnitude of movement in the designated axis and the axis address are directly transferred from the operation part of a computer to the D-buffer-register DRB and to the ADR-buffer-register AR.

Pulse distributing arithmetic operation is performed by the known DDA system. When the signal H0 is produced by the axis number selection decoder DR, for example, and axis No. 0 is selected, the contents of the register C0 of the memory M5 are added to the contents of the register A0 of said memory and the result is stored in the A-register. If an overflow pulse OVF is produced in the full adder FA', said overflow pulse is utilized as a distribution pulse. It is known that if the aforedescribed arithmetic operation is repeated at a constant period, the overflow pulse OVF is produced at a frequency corresponding to the command data, which command data is the contents of the register C0.

In the described embodiment, the arithmetic operation is performed in accordance with the principle of time sharing for each axis, so that when an addition for axis No. 0 is completed, the next axis No. 1 is selected. A similar operation is then performed. Such operation is repeated successively. When the operation for axis No. 15 is completed, a similar operation is performed for axis No. 0.

An end point detector DE functions to indicate a designated axis such as, for example, axis No. 0, and determines or detects whether pulses of a number equal to the command data of the register C0 for the selected axis have been transferred to the output. That is, the end point detector DE detects or determines the end point. The end point detector DE determines the result of the addition stored in the buffer register B', each time there is an addition operation. When the result of the addition reaches a value of 1 0 0 0 . . . 0, an end point detecting signal "1" is transferred to a line L1.

The end point detecting or determining process is known and is based on the principle that if one bit is provided in addition to the minimum bit of the command data, and said one bit becomes "1," and the bits are regarded as the command data as a whole and are added successively to the register, overflow pulses of a number equal to the command data are produced when the accumulated value has reached 1 0 0 0 . . . 0. A coincidence detector COI transfers the transfer controlling command signal to a control circuit CC2.

The transfer controlling command is transferred from the coincidence detector COI to the control circuit CC2 via a gate G19 at the designated time when the address designated for the buffer register AR coincides with the contents of the S-counter. The contents of the S-counter are the axis address. At such time, the control circuit CC2 stores the contents of the D-buffer-register DRB in the C-register of the axis designated by the ADR-buffer-register AR and clears the corresponding A-register.

A plurality of synchronizing flip-flops or flip-flop circuits SF0 to SF15 are provided in the circuit of FIGS. 5A and 5B. The synchronizing flip-flop circuits SF0 to SF15 correspond to the 16 axes and each of said circuits may store a maximum of three overflow pulses for an axis. Each of the synchronizing flip-flop circuits SF0 to SF15 supplies an overflow pulse to a smoothing circuit, hereinafter described, in synchronism with a feed pulse supplied from the aforedescribed feed pulse generator FPG. Consequently, one pulse is reduced from the residual pulses in the synchronizing flip-flop circuit. Thus, the distribution pulses of the pulse distributor may be supplied successively in synchronism with the feed pulses.

In FIGS. 5A and 5B, three axes, which are axes Nos. 0, 1 and 2, are utilized for the simultaneous three axis control of a control object such as, for example, a machine tool, and another three axes, axes Nos. 3, 4 and 5, are utilized to control another machine tool or object. For this reason, in the first machine tool, for example, when the synchronizing flip-flop circuits SF0, SF1 and SF2 are all full, that is, they have three residual pulses, it is necessary to prevent further pulse distributing arithmetic operation. For this purpose, a synchronizing flip-flop monitor circuit KC and a machine number switching circuit MS are provided.

The machine number switching circuit MS causes the axis number of the decoder DR to correspond to the machine number and the outputs H0 to H15 of said decoder are collected into a plurality of groups by a plurality of OR-gates 031, 032,...03n. When none of the synchronizing flip-flop circuits SF0 to SF2 corresponding to axes Nos. 0 to 2, utilized to control the machine tool No. 0, is completed, and the arithmetic operation of axes Nos. 0 to 2 is selected, a signal "1" is supplied to a line L2 via an AND-gate G20 and an OR-gate 04 of the synchronizing flip-flop monitor circuit KC. This also applies to the other machine tools, and if even one of the synchronizing flip-flop circuits of the axes utilized for the control of a machine tool is full, the signal of the output line L2 of the synchronizing flip-flop monitor circuit KC becomes "0" and the pulse distributing arithmetic operation relating to the axes belonging to said machine tool is momentarily halted.

A data transfer requiring circuit IT comprises 16 gates G21 to which the outputs H0 and H15 of the axis number selection decoder DR and the output of the end point detector DE are supplied as input and data transfer requiring flip-flops which are set in correspondence with the outputs of said gates. When an end point is detected or determined, the data transfer flip-flop of the corresponding machine tool is switched to its set condition and requires the next succeeding command data from the computer.

The data transfer requiring circuit IT is coupled to the control circuit CC2 via an inverter I1, a gate G22 and a flip-flop EX. The control circuit CC2 controls a group of gates G22 of the arithmetic circuit so that the flip-flop EX may be set through the gate G22. The designated pulse distributing arithmetic operation may be executed if a gate signal GEX is supplied to the gate G22 at the suitable time when the end point has not been reached and the output signal "1" appears in the line L2.

FIG. 6 is a circuit diagram illustrating the details of the control circuit CC2 of FIG. 5B. The control circuit CC2 of FIG. 6 comprises a plurality of AND-gates G23, G24, G25, G26, G27, G28 and G29, OR-gates 05 and 06, an inverter I2 and the flip-flop EX. Input data supplied to the control circuit CC2 includes the outputs T0 to T3 of the T-counter of the timing counter of FIG. 5A and the output of the coincidence detector COI of FIG. 5B. A flip-flop BSY' of the time-shared multiplexing pulse distributor MPD of FIG. 5B supplies a BSY' signal to the control circuit CC2. The BSY' signal is "0" when the ADR-buffer-register AR is clear and is "1" when data is set or stored in said buffer register.

The output of the flip-flop EX of FIG. 5B is supplied to the control circuit CC2 to control the arithmetic operation. Clocks CLK and command signals relating to the first axis number of each machine tool are supplied to the control circuit CC2. The control circuit CC2 produces gate control signals GAB, GDB, GADD, GWT, BCLR and GEX, at the designated times. The signal BCLR functions to clear the buffer register B'.

In the transfer cycle, when command data and axis addresses are directly set or stored in the D-buffer-register DRB and the ADR-buffer-register AR from the operation part of the computer, the flip-flop BSY' is switched to its "1" or set condition. When the counting of the T-counter proceeds and the contents of said T-counter coincides with the contents of the ADR-buffer-register AR, the coincidence detector COI produces a coincidence signal and a transfer controlling signal is supplied to the control circuit CC2 via the gate G19. This initiates the transfer cycle.

When the signal T0 is in evidence, the gate G24 of the control circuit CC2 is switched to its conductive condition by said signal from the T-counter. The command signal stored in the D-buffer-register DRB is then transferred to the buffer register B'.

When the signal T1 is in evidence, the control circuit CC2 produces the signal GWT. The contents of the buffer register B', which contents are the command data, are written into the C-register of the axis selected at such time via the gate G18.

When the signal T2 is in evidence, the control circuit CC2 produces the signal BCLR upon the supply of the clock pulse CLK. The buffer register B' is cleared.

When the signal T3 is in evidence, the control circuit CC2 produces the signal GWT via the AND-gate G27 and the OR-gate 05. The signal GWT writes the contents of the buffer register B', which contents are "0," into the A-register of the selected axis and said A-register is cleared.

The command data supplied to the D-buffer-register DRB is thus stored in the C-register corresponding to the axis address supplied to the ADR-buffer-register AR. The A-register of the same axis is cleared and the supply of the command data may be accomplished. It is evident that the supply of the command data may be accomplished independently and without relation to the distributing arithmetic operation of the other axes.

In arithmetic operation, considering one axis, the contents of the A-register are transferred to the buffer register B' and the contents of the C-register are read out and added to the contents of said buffer register. The result is set or stored in the buffer register B' and is also written into the A-register. If there is an overflow pulse during this period of time, it is stored in the synchronizing flip-flop circuits SF0 to SF15.

When the signal T0 is in evidence, the control circuit CC2 produces the signal GAB and the contents of the A-register of the designated axis are transferred to the buffer register B' via the gate G14.

When the signal T1 is in evidence, the control circuit CC2 produces the gate control signal GEX. If none of the end point detecting synchronizing flip-flops is full, the flip-flop EX produces the signal EX to control the execution of arithmetic operation.

When the signal T2 is in evidence, the control circuit CC2 produces the gate control signal GADD. The gate G16 of FIG. 5A is switched to its conductive condition, so that the contents of the selected C-register and the contents of the buffer register B' are added in the full adder FA'. The result or sum is stored in the buffer register B'. If an overflow pulse is produced at such time, said pulse is stored in the synchronizing flip-flop circuit SF0 to SF15 of the designated selected axis via the gate G17.

When the signal T3 is in evidence, the control circuit CC2 produces the gate control signal GWT and the contents of the buffer register B' are written into the A-register of the selected axis via the gate G18 of FIG. 5A. When the T-counter is returned to its condition T0, and the S-counter counts "1," the next axis is selected and the same arithmetic operation is performed. When the next command data is supplied to the registers C0, C1 and C2 of the memory M5, after the termination of the pulse distribution to the first axis No. 0, controlled by three axes, command data is supplied in an order opposite that of processing of the time-shared arithmetic operation cycle. The order may be, for example, the register C2, the register C1, the register C0, so that, as hereinbefore described, pulse distributing arithmetic operation may be initiated automatically when the last register A0 is cleared.

It is known that when a servomotor such as, for example, a pulse motor, is driven by a command pulse train, the command pulse train is supplied to the servomotor via a smoothing circuit to ensure the correct response of the servomotor. Even when the command pulse train is an instantaneous pulse train or a pulse train from which some pulses are missing, the smoothing circuit may convert the command pulse train so that the pulse repetition rate or frequency may vary smoothly. In the described embodiment of the invention, such smoothing process is provided by a digital arithmetic operation. Furthermore, the smoothing circuit is a multiplexing smoothing circuit and the arithmetic circuit included therein is utilized in common with all the axes.

Figure 8:
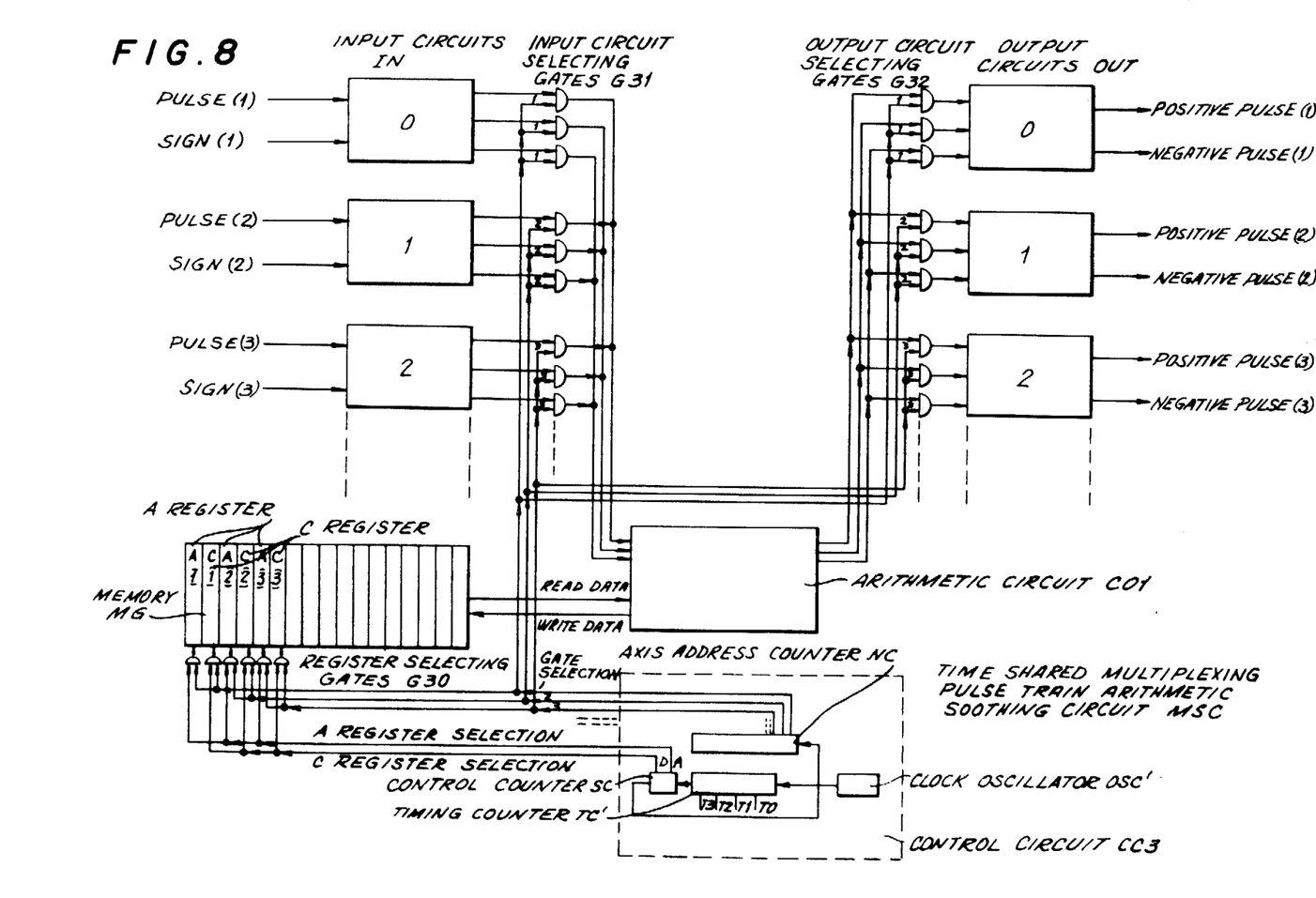
FIG. 8 is a block diagram of an embodiment of the time-shared multiplexing pulse train arithmetic smoothing circuit MSC of FIG. 1.

FIG. 8 is a block diagram of the time-shared multiplexing pulse train arithmetic smoothing circuit MSC. The smoothing circuit MSC comprises a plurality of input circuits IN, a plurality of output circuits OUT, a memory M6, an arithmetic circuit C01 and a control circuit CC3. The input circuits comprise a plurality of inputs IN0, IN1, IN2, . . . . The output circuit comprises a plurality of outputs OUT0, OUT1, OUT2, . . . . The number of input and output circuits corresponds to the number of axes. That is, the number of input circuits IN is equal to the number of output circuits OUT and to the number of axes.

The memory M6 has a plurality of A-registers including the register A0, the register A1, . . . the register A$n$, and a plurality of C-registers, including the register C0, the register C1, . . . the register C$n$. The A-registers and the C-registers correspond to the number of axes. The control circuit CC3 comprises a clock oscillator OSC', a timing counter TC', a control counter SC and an axis address counter NC. The timing counter TC' is a quaternary counter and cycles through four conditions T0, T1, T2 and T3. The control counter SC is a binary counter and operates each time the timing counter TC' completes one cycle. The axis address counter NC counts one pulse each time the control counter SC completes one cycle. In the axis address counter NC, the counted value is decoded and an output signal "1" is supplied to an output line corresponding to the address, the A- and C-registers, an input circuit and an output circuit corresponding to the axis address selected.

A plurality of register selecting gates G30, a plurality of input circuit selecting gates G31 and a plurality of output circuit selecting gates G32 are provided in the smoothing circuit MSC. The arithmetic circuit C01 completes the designated arithmetic operation corresponding to the input and the stored numerical value of the selected axis and supplies the pulse to the corresponding output circuit.

In the described embodiment, the smoothing circuit MSC operates in accordance with the known DDA pulse distribution system. The DDA pulse distribution system utilizes a C-register for counting input pulses and an A-register to which the accumulated value of the C-register is added at a constant period. If an overflow pulse is produced as a result of an addition operation, said overflow pulse is supplied to the output pulse of the smoothing circuit. Simultaneously, "1" is subtracted from the contents of the C-register.

It may thus be readily confirmed that even when the command pulse train is an instantaneous pulse train or a pulse train from which some pulses are missing, an output pulse train having a rapid variation of frequency, or change of pulse interval, may be provided. In the described embodiment of the invention, a multiplexing smoothing circuit is provided based on the aforedescribed principle and, as shown in FIG. 8, axes are successively selected by the output of the axis address counter NC, and the arithmetic operation for distributing pulses to each selected axis is provided by the control of the register selecting gates G30 of the memory M6 and the arithmetic circuit C01 by the timing counter TC' and the control counter SC. The arithmetic circuit C01 processes residual pulses, corresponding to the value stored in the C-register, and distributes pulses.

Figure 9:
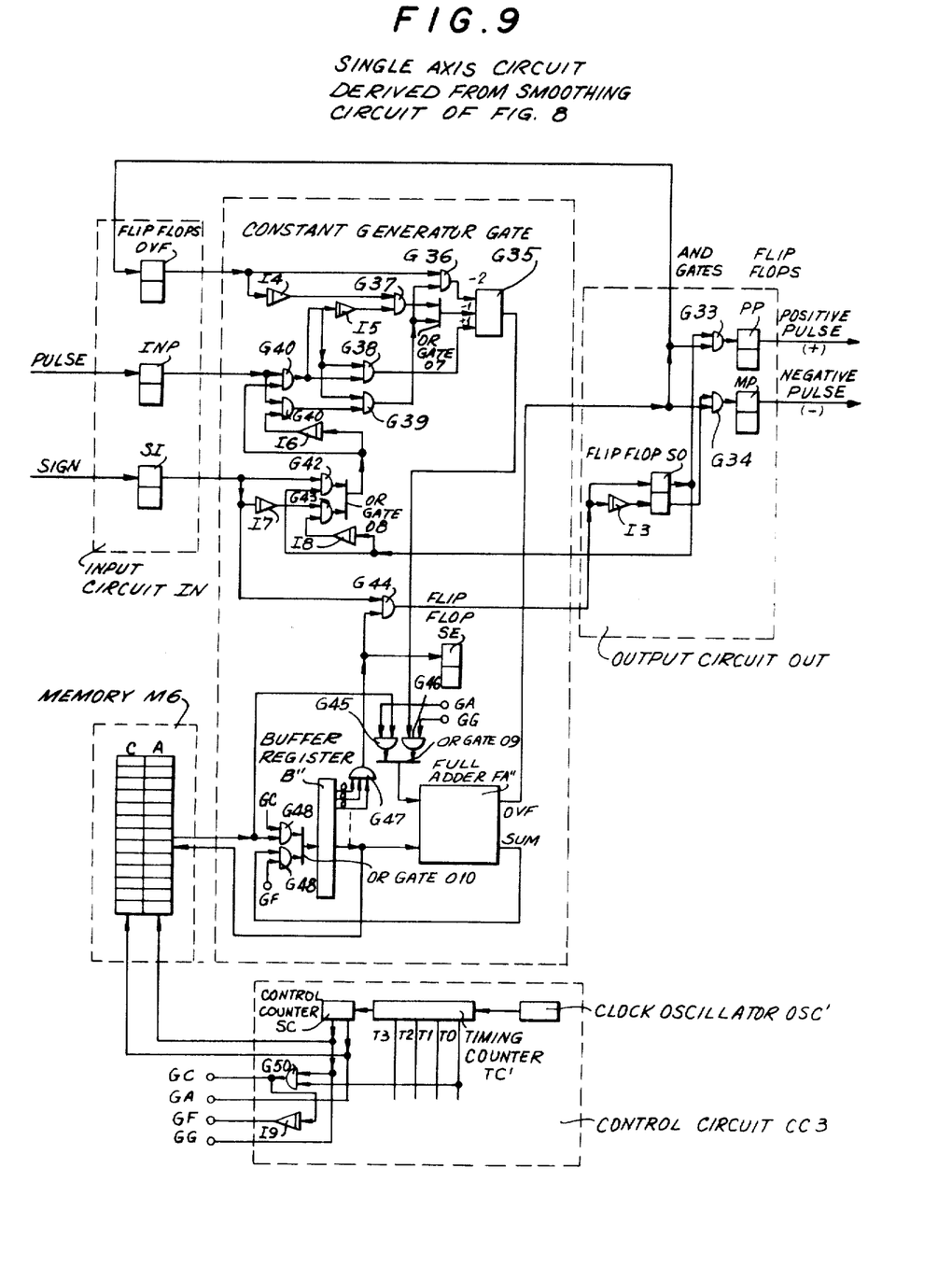
FIG. 9 is a circuit diagram of an embodiment of a single axis circuit derived from the time-shared multiplexing pulse train arithmetic smoothing circuit MSC of FIG. 8.

FIG. 9 is a single axis circuit derived from the smoothing circuit of FIG. 8 and is a circuit diagram of said smoothing circuit corresponding to a single axis. FIG. 9 includes an input circuit IN, an output circuit OUT, both of which circuits are for a single axis, and the arithmetic circuit C01, the memory M6 and the control circuit CC3, utilized in common for all the axes.

The input circuit IN comprises a flip-flop INP for storing pulses supplied by the pulse distributor MPD via a synchronizing flip-flop circuit. The input circuit IN also comprises a flip-flop SI for storing the sign or polarity of command data relating to the magnitude of movement, from the computer. The input circuit IN further comprises a flip-flop OVF for storing overflow pulses produced as a result of arithmetic operation hereinafter described.

The output circuit OUT comprises a flip-flop SO for storing an indication of to which of the positive or negative output pulse the overflow output pulse of the smoothing circuit is supplied. The output circuit OUT further comprises AND-gates G33 and G34, flip-flops PP and MP, and an inverter I3. The arithmetic circuit C01 comprises a constant generator gate G35 for generating constants $+1, -1$ and $-2$, a full adder FA'', a buffer register B'' and a flip-flop SE for detecting or determining "0" of the buffer register B''. The arithmetic circuit C01 further comprises a plurality of AND-gates G36, G37, G38, G39, G40, G41, G42, G43, G44, G45, G46, G47, G48 and G49, a plurality of OR-gates 07, 08, 09 and 010, and a plurality of inverters I4, I5, I6, I7 and I8.

The control circuit CC3 produces arithmetic operation gate control signals GC, GA, GF and GG of the arithmetic circuit C01. The gate control signals GC, GA, GF and GG are produced in the control circuit CC3 via an AND-gate G50 and an inverter I9. The output signals GC, GA, GF and GG correspond to the outputs T0, T1, T2 and T3 of the timing counter TC' and the outputs A and D of the control counter SC.

Figure 10:
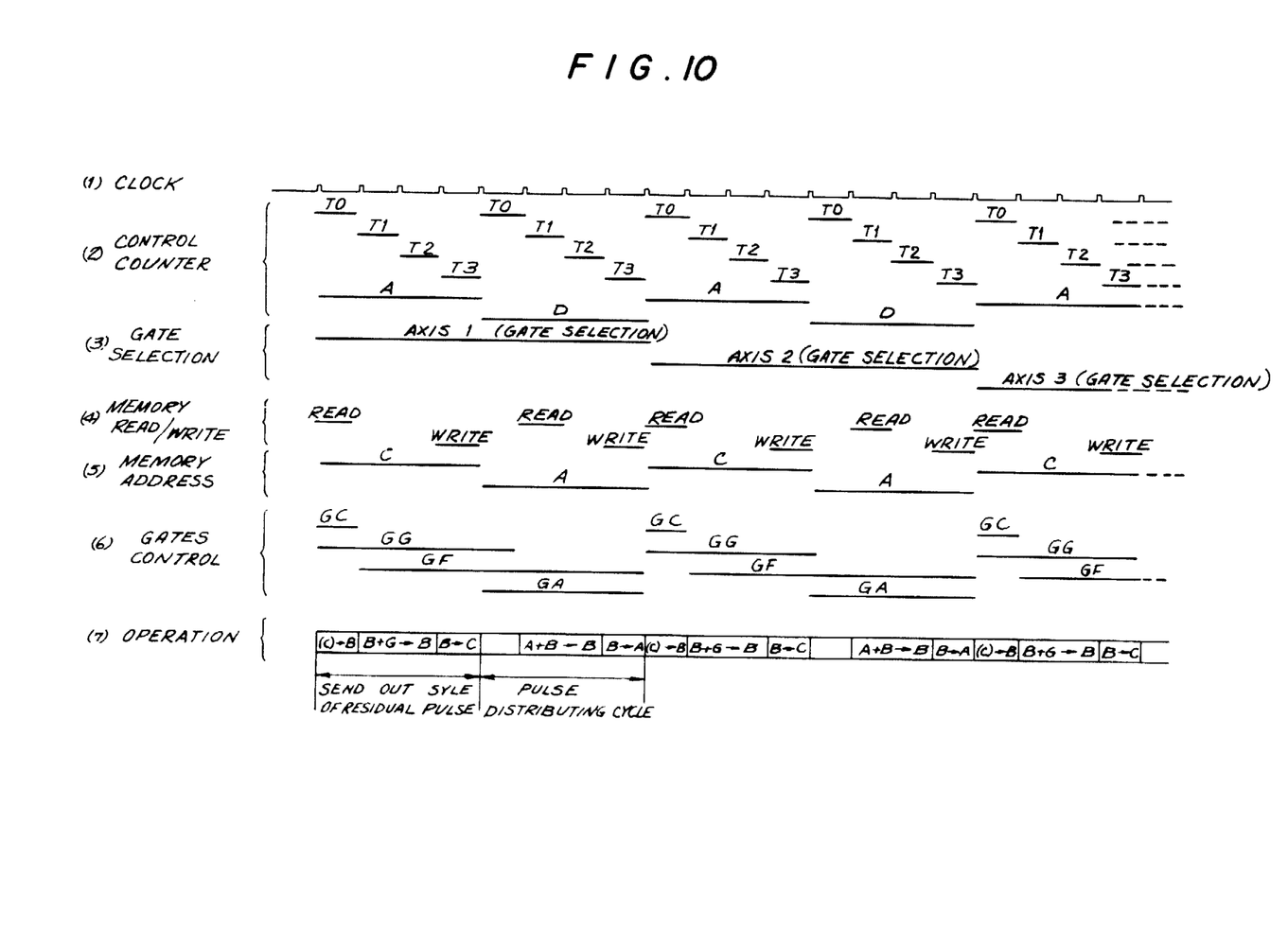
FIG. 10 is a time chart explaining the operation of the circuit of FIGS. 8 and 9.

When the signal or residual pulse T0 is in evidence, the gate control signal GC is produced by the control circuit CC3 and the contents of the C-register of the selected axis are transferred to the B-register (FIG. 10–6).

When a signal or residual pulse T1 or T2 is in evidence, the control circuit CC3 produces the gate control signal GF (FIG. 10–6) and the contents of the buffer register B'' are added to the output of the constant generator gate G35 in the full adder FA''. The result is stored in the buffer register B''. If an overflow pulse is produced in the next-preceding pulse distributing arithmetic operation, the flip-flop OVF of the input circuit IN is switched to its set condition, and if there is no input pulse in the flip-flop INP of said input circuit, a constant $-1$ signal is supplied from the constant generator gate G35 to the full adder DA'' via the OR-gate 07. When there are residual pulses in both flip-flop OVF and INP of the input circuit IN, a constant $-2$ signal is supplied from the constant generator gate G35 to the full adder FA'' via the AND-gate G36.

If a signal or residual pulse T3 is in evidence, the contents of the buffer register B'' are transferred to the C-register by a WRITE signal (FIG. 10–4) and the transfer cycle of residual pulses is terminated.

In the pulse distributing cycle, an A-register is selected. When the T1 signal is in evidence, the contents of the A-register are added to the contents of the buffer register B'' via the gate control signal GA and the result or sum is stored in said buffer register. At such time, if there is an overflow pulse, such pulse is transferred to the positive output terminal or to the negative output terminal via the flip-flop PP or MP corresponding to the condition of flip-flop SO.

Upon the termination of the pulse distributing cycle, the axis address counter NC of FIG. 8 advances by one step and the next axis is selected. The provision of residual pulses and the pulse distributing arithmetic operation are then performed in the same manner. When the contents of the C-register are added to the constant, and the result is transferred to the buffer register B'' in the transfer cycle of residual pulses, the gate G47 determines or detects whether the contents of said buffer register are "0" or "1." If the contents of the buffer register B'' is "0," the flip-flop S0 of the output circuit OUT is switched to its set or reset condition in accordance with the condition of the flip-flop SI of the input circuit IN. The flip-flop SE of the arithmetic circuit C01 is switched to its set condition by the contents of the buffer register B'', which contents are "0," and thus is utilized to clear the A-register in the next pulse distributing arithmetic operation.

While the invention has been described by means of a specific example and in a specific embodiment, we do not wish to be limited thereto, for obvious modifications will occur to those skilled in the art without departing from the spirit and scope of the invention.

We claim:

1. A time-shared numerical controller for simultaneously controlling machine tools each having at least one axis in movement along the corresponding axes, said controller comprising a time-shared multiplexing pulse distributor, said pulse distributor having memory means, input means coupled to the memory means of said pulse distributor for writing into said memory means command data and the results of an arithmetic operation relating to the magnitude of movement of a plurality of movable axes to be controlled, output means coupled to said memory means for reading out from said memory means said command data and said results, a selecting circuit coupled to said memory means for selecting the place of write-in and readout of data to and from said memory means, and a time-shared multiplexing pulse train arithmetic circuit coupled to said pulse distributor for providing arithmetic operations and pulse distribution in common for all the axes of the machine tools; and output means coupled to said arithmetic circuit for separating and providing output pulses corresponding to the axes of each of the machine tools.

2. A time-shared numerical controller as claimed in claim 1, further comprising a time-shared multiplexing pulse train smoothing circuit coupled between said pulse distributor and said output means for independently smoothing pulse trains distributed to said plurality of axes, said smoothing circuit comprising memory means, input means coupled to the memory means of said smoothing circuit for writing into said memory means the accumulated value and the results of an arithmetic operation relating to pulses distributed by said pulse distributor to the plurality of movable axes, output means coupled to said memory means for reading out from said memory means said accumulated value and said results, and a selecting circuit coupled to said memory means for selecting the place of write-in and readout of data to and from said memory means.

3. A time-shared numerical controller as claimed in claim 1, further comprising a time-shared multiplexing feed pulse generator for independently controlling the feed rate of feed pulses from the plurality of axes, said feed pulse generator comprising memory means, input means coupled to the memory means of said feed pulse generator for writing into said memory means command data and the results of an arithmetic operation relating to the feed rate of the feed pulses of the plurality of movable axes, output means coupled to said memory means for reading out from said memory means said command data and said results, and a selecting circuit coupled to said memory means for selecting the place of write-in and readout of data to and from said memory means, and wherein said arithmetic circuit is coupled to said feed pulse generator and said pulse distributor and said output means coupled to said arithmetic circuit provides the output pulses of said pulse distributor in synchronism with the output pulses of said feed pulse generator.

4. A time-shared numerical controller for simultaneously controlling machine tools each having at least one axis in movement along the corresponding axes, said controller comprising

- a time-shared multiplexing pulse distributor;
- a time-shared multiplexing pulse train smoothing circuit coupled to said pulse distributor for independently smoothing pulse trains distributed to said axes;
- a time-shared multiplexing feed pulse generator coupled to said smoothing circuit for independently controlling the feed rate of feed pulses of the axes, each of said pulse distributor, said smoothing circuit and said feed pulse generator having memory means, input means coupled to said memory means for writing into said memory means command data and the results of an arithmetic operation relating to the movable axes to be controlled, output means coupled to said memory means for reading out from said memory means said command data and said results, a selecting circuit coupled to said memory means for selecting the place of write-in and readout of data to and from said memory means, and
- a time-shared multiplexing pulse train arithmetic circuit coupled to said pulse distributor and to said feed pulse generator for providing arithmetic operations and pulse distribution in common for all the axes of the machine tools; and
- output means coupled to said arithmetic circuit and to said smoothing circuit for separating and providing output pulses corresponding to the axes of each of the machine tools.

* * * * *